United States Patent
Shinada et al.

(10) Patent No.: US 6,420,978 B1
(45) Date of Patent: Jul. 16, 2002

(54) POWER GENERATION SYSTEM AND FUEL SUPPLY METHOD

(75) Inventors: Osamu Shinada; Akira Yamada; Katsuhiko Shinoda; Eiichi Kobayashi; Shinji Arinaga, all of Nagasaki (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 0 days.

(21) Appl. No.: 09/690,382

(22) Filed: Oct. 17, 2000

(30) Foreign Application Priority Data

Apr. 28, 2000 (JP) ........................................ 2000-131649

(51) Int. Cl.⁷ .............................................. G08B 1/00
(52) U.S. Cl. ........................................ 340/999; 307/64
(58) Field of Search ............................ 340/999, 286.01, 340/635; 323/906; 60/641.8, 698, 706, 721; 307/43, 44, 64, 66, 84, 85, 86

(56) References Cited

U.S. PATENT DOCUMENTS 4,883,823 A * 11/1989 Perry, Jr. et al. ............ 518/702
5,223,781 A * 6/1993 Criswell et al. ............ 322/2 R
5,929,538 A * 7/1999 O'Sullivan et al. ........... 307/66
6,100,600 A * 8/2000 Pflanz ......................... 290/54

FOREIGN PATENT DOCUMENTS

DE 19502953 * 12/1995
JP 11299100 10/1999

* cited by examiner

Primary Examiner—Thomas Mullen
(74) Attorney, Agent, or Firm—Scully, Scott, Murphy & Presser

(57) ABSTRACT

An object of the present invention is to provide a power generation system and a fuel supply method which are suitable for isolated areas; in order to attain this object, a power generation system comprising an electric power generation facility which is arranged on an isolated area, generates electric power using energy source obtainable on an isolated area, and supplies the electric power to the isolated area and a fuel supply method comprising the steps of: moving a fuel production device between a plurality of isolated areas; producing fuel on the isolated area from the fuel material obtainable on the isolated area; and supplying the fuel to the electric power generation facility are provided.

6 Claims, 2 Drawing Sheets

POWER GENERATION SYSTEM AND FUEL SUPPLY METHOD

BACKGROUND OF THE INVENTION

1. Field of the Invention

The present invention relates to a power generation system and a fuel supply method for generating electric power at isolated areas such as an isolated island.

This application is based on the Japanese Patent Application No. Hei 12-131649, the contents of which are incorporated herein by reference.

2. Description of the Related Art

A general power generation system transmits electric power generated at the large-scale thermal power plant, hydraulic power plant, atomic power plant, etc. to consumers using transmission lines.

The transmission method using transmission lines is suitable for the area having large population or population density. However, this transmission method is not efficient for the areas which have a small population density and are isolated from these power plants, because transmission loss increases depending on the transmission distance. Therefore, this transmission method is not suitable for such areas. Consequently, many isolated areas such as isolated islands having a small population density have not been supplied electric power yet.

In consideration of the above described problems with conventional technology, it is an object of the present invention to provide a power generation system and a fuel supply method which are suitable for the isolated areas.

SUMMARY OF THE INVENTION

According to a first aspect of the present invention, the present invention provides a power generation system comprising an electric power generation facility which is arranged on an isolated area, generates electric power using an energy source obtainable on the isolated area, and supplies the electric power to the isolated area.

According to this power generation system, it is not necessary to transmit electric power generated outside of the isolated area to the isolated area using transmission lines. In other words, the electric power generated in the isolated area is used in the isolated area; therefore, a transmission loss is extremely small. Thus, this power generation system is suitable for the isolated areas having a small population density.

Moreover, the "isolated area" means an area that is far away from a metropolitan area, has a small population density, and where no or an extremely small amount of electric power is supplied, such as an isolated island, mountainous area, etc.

A second aspect of the present invention is the first power generation system, wherein the power generation system further comprises a battery device for storing the electric power generated by the electric power generation facility.

For example, when a solar cell or a wind mill is used as the power generation device in this power generation system, the output of electric power varies in response to weather variations. In addition, the amount of electric power required by the consumer varies during a day. According to this power generation system, it is possible to store the excess electric power and expend it as the need arises.

A third aspect of the present invention is the first power generation system, wherein the electric power generation facility comprises a plurality of electric power generation apparatuses which generate electric power using a different energy source respectively.

In this power generation system, the electric power generation facility using an energy source which is influenced by weather variations, such as wind force, and the electric power generation facility using an energy source which is not influenced by weather variations, such as en engine, are jointly used. Thereby, when the output of the electric power generation facility using an energy source which is influenced by weather variations decreases, the decrement can be compensated for by the electric power generation facility using an energy source which is not influenced by weather variations. In addition, the electric power generation facility using an energy source which can easily increase output can respond to a rapid increase in the amount of electric power required by the consumer.

The best energy source can be selected by considering the natural environment in the isolated area, economical efficiency, etc. However, the electric power generation facility using a renewable energy source and a non-fossil fuel, such as a wind mill, solar cell, methanol engine, fuel cell, micro-gas turbine, micro-water turbine, etc., are preferable. Moreover, the "renewable energy source" means the natural energy which is obtainable nearly limitlessly on the isolated area, such as sunshine, wind force, water power, etc or organisms, such as plants growing on the isolated area.

A fourth aspect of the present invention is the first power generation system, wherein the power generation system is used for a plurality of isolated areas; and a control center for controlling the electric power generation facilities, which is connected to the electric power generation facilities on the isolated areas via a communication device, is provided in at least one isolated area.

According to this power generation system, one control center controls the electric power generation facilities in a plurality of the isolated areas. Therefore, it is possible to decrease the number of the monitor and control persons in the electric power generation facilities. In addition, it is also possible to adjust optimally the output of the electric power generation facilities. Communication satellites such as a low-level orbital satellite, cable lines, etc. can be used as the communication device.

A fifth aspect of the present invention is the fourth power generation system, further comprising weather observation devices for obtaining weather observation data for the each isolated area and a control center for controlling the electric power generation facilities based on weather observation data input from the weather observation devices via the communication device.

In this power generation system, the control center controls the electric power generation facilities based on the weather observation data in response to weather variations. For example, when the solar cell which is influenced by weather variations and the engine which is not influenced by weather variations are jointly used as the electric power generation facility, and the output of the solar cell decreases due to weather variations, the amount of electric power required by the consumer can be obtained by increasing the output of the engine.

A sixth aspect of the present invention is the fourth power generation system, further comprising a fuel production device which produces fuel from the fuel material obtainable in at least one isolated area and supplies the fuel to at least one electric power generation facility.

According to this power generation system, it is not necessary to provide the fuel production device in all isolated areas. The produced fuel may be used in the isolated area where the fuel material is obtained, or may be used in the other isolated areas. When the power generation system is provided on a plurality of isolated islands, the fuel production device can be carried in a ship. When the power generation system is provided on a plurality of isolated land areas, the fuel production device can be carried in an automobile such as a trailer.

A seventh aspect of the present invention is the sixth power generation system, wherein the fuel material is a plant.

According to this power generation system, the fuel production device can be used in one isolated area while the plant is sufficiently growing again on another isolated areas where the plant is gathered.

A eighth aspect of the present invention is a fuel supply method comprising the steps of:

moving a fuel production device between each of a plurality of isolated areas where an electric power generation facility is provided;

producing fuel in the isolated area from the fuel material obtainable on the isolated area; and supplying the fuel to the electric power generation facility.

According to this fuel supply method, it is not necessary to provide the fuel production device in all isolated areas. The produced fuel may be used in the isolated area where the fuel material is obtained, or may be used in the other isolated areas.

A ninth aspect of the present invention is the fuel supply method wherein the method comprises the steps of:

producing the fuel in the isolated area from plants obtainable on the isolated area; and gathering the plants on the isolated area and moving the fuel production device in the other isolated area in order to gather the plants while the plants on the isolated area are growing.

Certain periods are required for growing the plant sufficient for harvesting again in the isolated area. In the meantime, the fuel production device moves to the other isolated area, the plant is gathered, and the fuel is produced from the plant. The produced fuel may be used in the isolated area where the fuel material is obtained, or may be used in the other isolated areas. When this fuel supply method is carried out in a plurality of isolated islands, the fuel production device can be carried in a ship. When this fuel supply method is carried out in a plurality of isolated land areas, the fuel production device can be carried in an automobile such as a trailer.

DETAILED DESCRIPTION OF THE PREFERRED EMBODIMENTS

Figure 1:
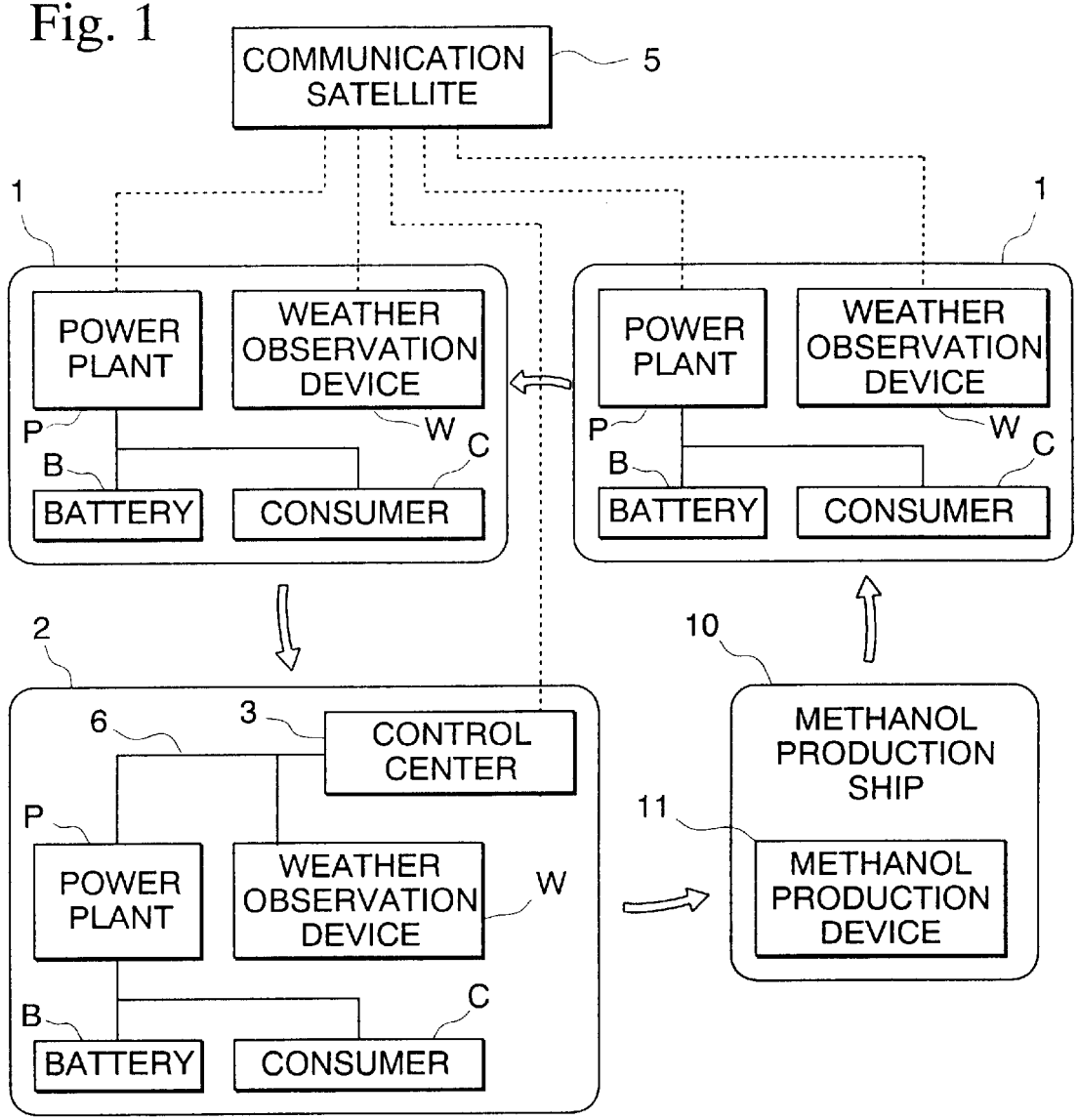
FIG. 1 is a block diagram showing the embodiment according to the present invention.

Next, an embodiment of the power generation system and the fuel supply method of the present invention will be explained referring to the drawings.

FIG. 1 is a block diagram showing the embodiment of the power generation system and the fuel supply method according to the present invention. The power generation system and the fuel supply method are suitable for a plurality of isolated islands.

In FIG. 1, reference numerals 1 and 2 denote the isolated islands (isolated areas). The power plant P, the consumer C such as a house, the battery B, and the weather observation device W are provided in each isolated island 1, 1 and 2. Electric power is supplied to the consumer C from the power plant P. Moreover, the control center 3 is provided on the isolated island 2.

The power plants P and the weather observation devices W provided on the isolated islands 1 and 1 are connected the control center 3, via the communication satellite (communication means) 5. Moreover, the power plant P and the weather observation device W of the isolated island 2 are connected the control center 3 by the cable line (communication means) 6.

Figure 2:
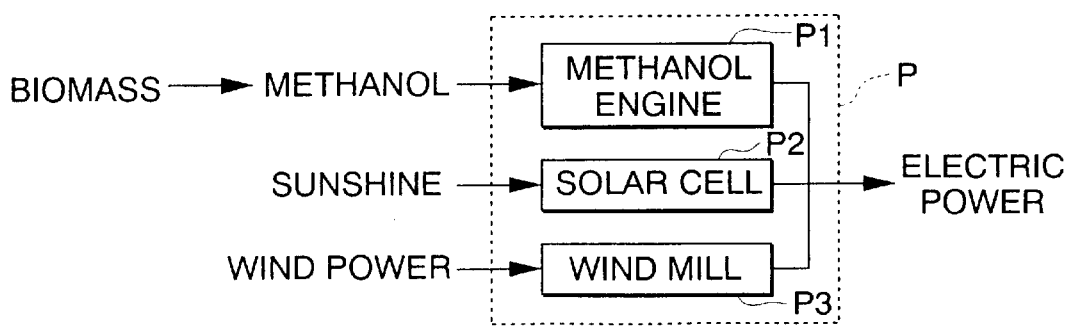
FIG. 2 is a block diagram showing the power plant provided in the power generation system shown in FIG. 1.

As shown in FIG. 2, each of the power plants P comprises the methanol engine P1, the solar cell P2, and the wind mill P3 as power plants. The methanol engine P1 is a diesel engine, and expends methanol produced by biomass (plants such as grass) gathered on the isolated island as fuel. The solar cell P2 generates electric power by receiving sunlight, and is suitable for generating electric power during fine weather in the daytime. The wind mill P3 generates electric power by receiving wind, and it can generate electric power during day and night. However, the amount of electric power generated by the wind mill P3 varies depending on the wind capacity. Moreover, the output of the wind mill P3 can be adjusted by adjusting the angle of the wings comprising the wind mill P3.

As shown in FIG. 1, the methanol production ship 10 cruises between the isolated islands 1, 1 and 2. The methanol production ship 10 comprises the methanol production device 11 for producing methanol from the biomass. The methanol production device 11 synthesizes methanol from the gas produced by drying and crushing all parts of biomass such as the stem, leaf, fruit, etc., and gasifying them using oxygen and vapor.

The operation of the system will be explained below.

First, the operation of the power plant P provided on the isolated islands 1, 1 and 2 will be explained referring FIGS. 3A and 3B.

Figure 3A:
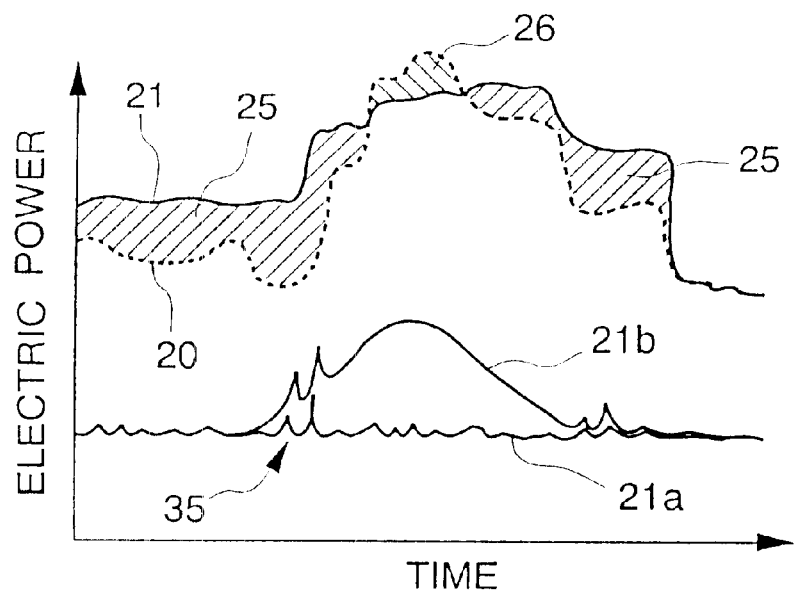
FIGS. 3A and 3B show the variation of the electric power in the isolated area, when the present invention is adopted.

FIG. 3A shows the variation of the electric power in the isolated islands 1, 1 and 2 when the weather is clear and windy. In FIG. 3A, the broken lines 20 denotes the electric power demand by the consumer C, the full line 21 denotes the electric power generated by the power plant P. More specifically, the full line 21a denotes the electric power generated by the methanol engine P1, the full line 21b denotes the electric power generated by the methanol engine P1 and the solar cell P2.

When the demand electric power 20 is less than the electric power 21 generated by the power plant P, the excessive electric power 25 is stored in the battery B. In contrast, when the demand electric power 20 is more than the electric power 21 generated by the power plant P, the insufficiency of the electric power 21 is compensated for by the stored electric power 26 in the battery B.

Moreover, it is impossible to increase the output of the solar cell P2 and the wind mill P3, depending on the rapid increase of the demand electric power 20. Therefore, as shown by the reference numeral 35, when the demand electric power 20 temporarily increases, the output of the methanol engine P1 increases.

Figure 3B:
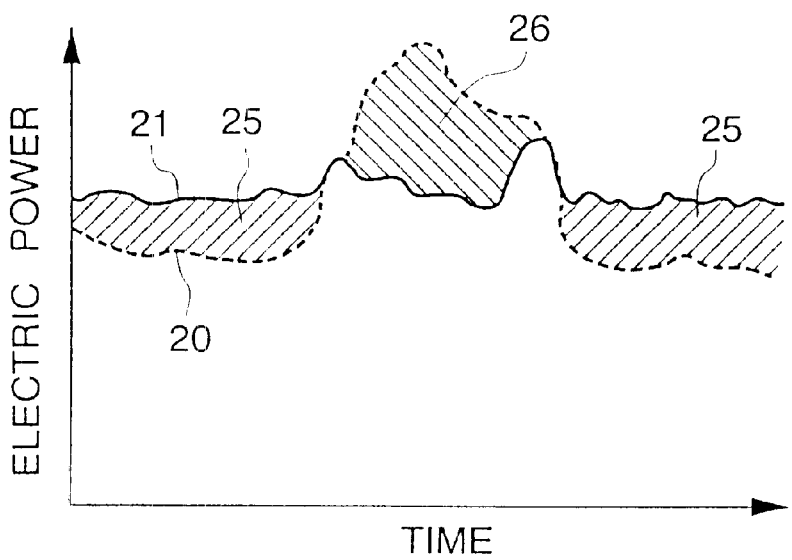

FIG. 3B shows the variation of the electric power in the isolated islands 1, 1 and 2 when the weather is rainy and slightly windy. In this case, the electric power generated by the solar cell P2 and the wind mill P3 decreases; therefore, the output of the methanol engine P1 increases. When the demand electric power 20 is more than the electric power 21 generated by the power plant P, the insufficiency of the electric power 21 is compensated for by discharging the battery B.

The power plant P is controlled in the control center 3 provided on the isolated island 2. The observation data of the weather observation device W provided on the isolated islands 1 and 1 are input in the control center 3, via the communication satellite 5. Moreover, driving data such as the amount of generated electric power, the effective availability of sunshine, etc of power plant P are also input in the control center 3, via the communication satellite 5.

The control center 3 controls the power plant P based on the observation data and the driving data. The power plant P adjusts the output by the methanol engine P1, the angle of the wings comprising the wind mill P3 based on the commands from the control center 3. The power plant P provided on the isolated island 2 is operated similarly to the power plant P provided on the isolated islands 1 and 1, except that the power plant P provided on the isolated island 2 is connected the control center 3, via the cable line 6.

Methanol used by the methanol engine P1 as a fuel is produced from the biomass gathered on the isolated islands 1, 1 and 2, explained above. However, when economical efficiency is considered, it is not preferable to provide the methanol production device 11 in both isolated islands 1, 1 and 2. Therefore, the methanol production ship 10 cruises between the isolated islands 1, 1 and 2. When the methanol production ship 10 stays at either the isolated island 1, 1 or 2 or the isolated island 2, the biomass is gathered on the isolated island 1, 1 or 2 where the methanol production ship 10 stays and carried to the methanol production ship 10. Then, methanol is produced from the biomass by the methanol production device 11 provided in the methanol production ship 10. The methanol produced in the methanol production ship 10 is discharged in the isolated island 1, 1 or 2.

Certain periods are required for growing biomass in quantities sufficient for gathering again on the isolated island 1, 1 or 2. In the meantime, the methanol production ship 10 moves to the other isolated island 1, 1 or 2, the biomass is gathered, and methanol is produced from the biomass. Then the methanol production ship 10 supplies methanol to the isolated island 1, 1 or 2 where the biomass does not grow sufficiently. In this way, the isolated islands 1, 1 or 2 jointly own the methanol production ship 10.

The following effects can be obtained by this embodiment.

(1) The power plants P provided on the isolated islands 1, 1 and 2 generate respectively electric power in each isolated island 1, 1 and 2. Therefore, it is not necessary to transmit the electric power generated in the isolated island 1, 1 or 2 to the other isolated island 1, 1 or 2. The transmission loss does not occur. Moreover, the electric power is generated using the energy obtainable on the isolated islands 1, 1 and 2, such as methanol produced from biomass, sunshine, and wind force; therefore, it is not necessary to carry the fuel required to generate electric power from the outsides of the isolated islands 1, 1 and 2. Consequently, the area having a low population density can economically generate electric power.

In addition, the solar cell P2 and the wind mill P3 do not generate carbon dioxide. Carbon dioxide generated due to the combustion of methanol is anabolized by the biomass again. Therefore, this embodiment does not discharge carbon dioxide, and does not affect the environment, compared with the electric power generation using a fossil fuel.

(2) The battery B is provided on the isolated islands 1, 1 and 2; therefore, it is possible to store the excess electric power 25 and expend it as the need arises. Therefore, electric power can be stably supplied to the consumer C when the weather varies.

(3) The power plant P comprises the methanol engine P1, the solar cell P2, and the wind mill P3. The methanol engine P1 expends methanol produced from biomass as a fuel. The solar cell P2 harnesses sunshine, and the wind mill P3 harnesses wind force. For example, when the duration of sunshine decreases and the amount of electric power generated by the solar cell P2 decreases, the decrement can be compensated for by the methanol engine P1.

(4) The control center 3 provided on the isolated island 2 controls the power plants P provided on the isolated islands 1 and 1, via the communication satellite 5. Therefore, it is possible to decrease the number of the monitor and control persons in the power plants P on the isolated islands 1 and 1.

(5) The weather observation device W is provided on the isolated islands 1, 1 and 2. The weather observation data from the weather observation devices W is input in the control center 3, via the communication satellite 5 or the cable line 6. The control center 3 controls the power plant P based on the weather observation data such as the duration of sunshine, wind direction, wind capacity, and temperature in the isolated islands 1, 1 and 2. For example, when the duration of sunshine or the wind capacity is short, the control center 3 commands the methanol engine P1 to increase the output. Thereby, the power plant P can generate the amount of electric power needed for the consumer C, in spite of weather variations.

(6) The methanol production ship 10 carrying the methanol production device 11 cruises between the isolated islands 1, 1 and 2. It is not necessary to provide the methanol production device 11 on each isolated island 1, 1 and 2. Therefore, it is economical. The methanol production device 11 produces methanol in the isolated island 1, 1 or 2 while biomass is sufficiently growing in the other isolated island 1, 1 or 2. Therefore, the methanol production device can be efficiently used.

(7) When the elements needed for a repair of the power plant P, the weather observation device, etc, are carried in advance in methanol production ship 10, the power plant P, the weather observation device W, etc., on the isolated island 1, 1 or 2 can be repaired while the methanol production ship 10 stays at the isolated island 1, 1 or 2.

(8) Methanol can be shipped between the isolated islands 1, 1 and 2 by the methanol production ship 10. Therefore, methanol can be shipped from the isolated island 1, 1 or 2 where excess methanol is stored to the isolated island 1, 1 or 2 where there is a shortage of methanol.

(9) Methanol produced in the methanol production ship 10 can be used in the cars as a fuel besides a fuel of the power plant P.

What is claimed is:

1. A power generation system comprising:
   electric power generation facilities which are arranged at an isolated area, generate electric power using an energy source obtainable at the isolated area, and supply the electric power to the isolated area; wherein the power generation system is used for a plurality of isolated areas; and
   a control center for controlling the electric power generation facilities, which is connected to the electric power generation facilities in the plurality of the isolated areas via a communication device, is provided in at least one of the plurality of the isolated areas.

2. A power generation system comprising:

electric power generation facilities which are arranged at an isolated area, generate electric power using an energy source obtainable at the isolated area, and supply the electric power to the isolated area; and weather observation devices for obtaining weather observation data for each isolated area and a control center for controlling the electric power generation facilities based on weather observation data input from the weather observation devices via the communication device, wherein the power generation system is used for a plurality of isolated areas; and a control center for controlling the electric power generation facilities, the control center being connected to the electric power generation facilities in the plurality of the isolated areas via a communication device, the control center being provided in at least one of the plurality of the isolated areas.

3. A power generation system comprising:

electric power generation facilities which are arranged at an isolated area, generate electric power using fuel obtainable at the isolated area, and supply the electric power to the isolated area;

a fuel production device which produces the fuel from fuel material obtainable in at least one of a plurality of isolated areas and supplies the fuel to at least one electric power generation facility, wherein the power generation system is used for the plurality of the isolated areas; and a control center for controlling the electric power generation facilities, the control center being connected to the electric power generation facilities in the plurality of the isolated areas via a communication device, the control center being provided in at least one of the plurality of the isolated areas.

4. A power generation system comprising:

electric power generation facilities which are arranged at an isolated area, generate electric power using fuel obtainable at the isolated area, and supply the electric power to the isolated area; and a fuel production device which produces the fuel from fuel material obtainable in at least one of a plurality of isolated areas and supplies the fuel to at least one electric power generation facility, wherein the power generation system is used for the plurality of the isolated areas;

a control center for controlling the electric power generation facilities, the control center being connected to the electric power generation facilities in the plurality of the isolated areas via a communication device, the control center being provided in at least one of the plurality of the isolated areas; and said fuel material is a plant material.

5. A fuel supply method comprising the steps of:

moving a fuel production device between a plurality of isolated areas at each of which an electric power generation facility is provided;

producing a fuel in one of the plurality of the isolated areas from fuel material obtainable thereat; and supplying the fuel to the electric power generation facilities.

6. A fuel supply method according to claim 5 comprising the steps of:

gathering plants at one of the plurality of the isolated areas and moving the fuel production device in one of the rest of the plurality of the isolated areas in order to gather plants while the plants at one of the plurality of the isolated areas are growing; and producing fuel at one of the rest of the plurality of the isolated areas from plants obtainable at one of the plurality of the isolated areas.

* * * * *